(No Model.)

J. M. MILLER.
VEHICLE BRAKE.

No. 489,024. Patented Jan. 3, 1893.

Attest
Alfred M. Davis
John C. Thom

Inventor
John M. Miller
by Chas Spengel Atty.

UNITED STATES PATENT OFFICE.

JOHN M. MILLER, OF WESTWOOD, OHIO.

VEHICLE-BRAKE.

SPECIFICATION forming part of Letters Patent No. 489,024, dated January 3, 1893.

Application filed September 16, 1892. Serial No. 446,065. (No model.)

*To all whom it may concern:*

Be it known that I, JOHN M. MILLER, a citizen of the United States, residing at Westwood, in the county of Hamilton and State of Ohio, have invented certain new and useful Improvements in Vehicle-Brakes; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to improvements in brakes for vehicles such as wagons, buggies, carriages &c., and the novel features are a construction whereby springs are used in a peculiar manner which prevents rattling at the joints of the mechanism when the brake is off and also serves to bring the brake-shoe instantly out of contact with the wheel, when the lever whereby it is operated is released. Provision is also made which prevents any strain on the springs, supporting the body while the brake is on, in which position the latter tends to push the wheels out from under the body and away from the springs. My construction also permits the use of a pliable connection between the brake-mechanism and the mechanism whereby it is operated which is a great convenience especially on bodies which are not straight on their underside and where for this reason a stiff rod could not be used very well.

Figure 1:
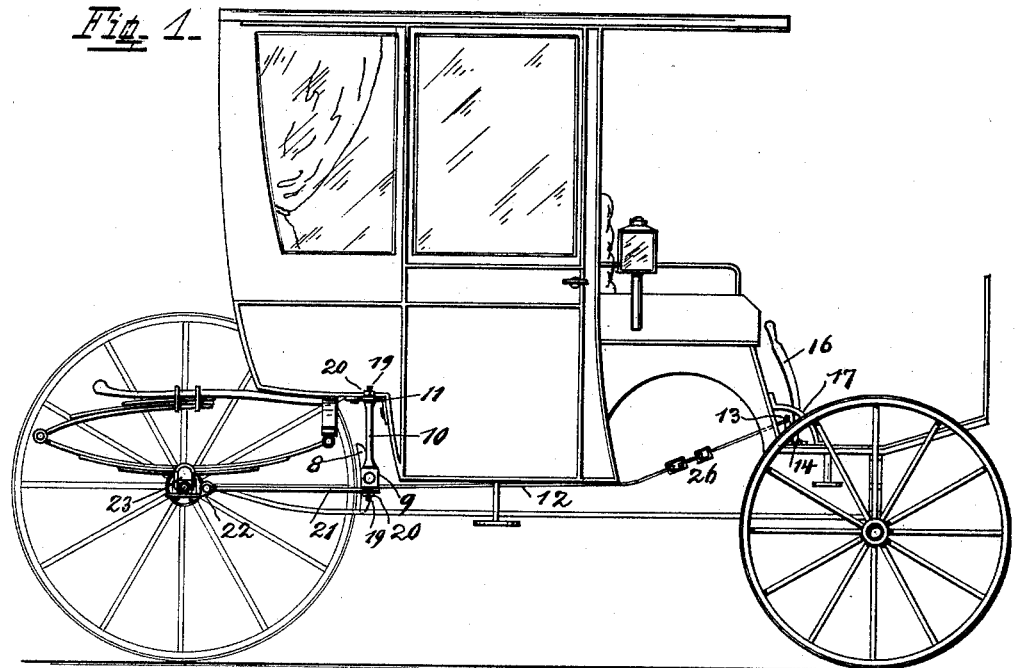
Figure 2:
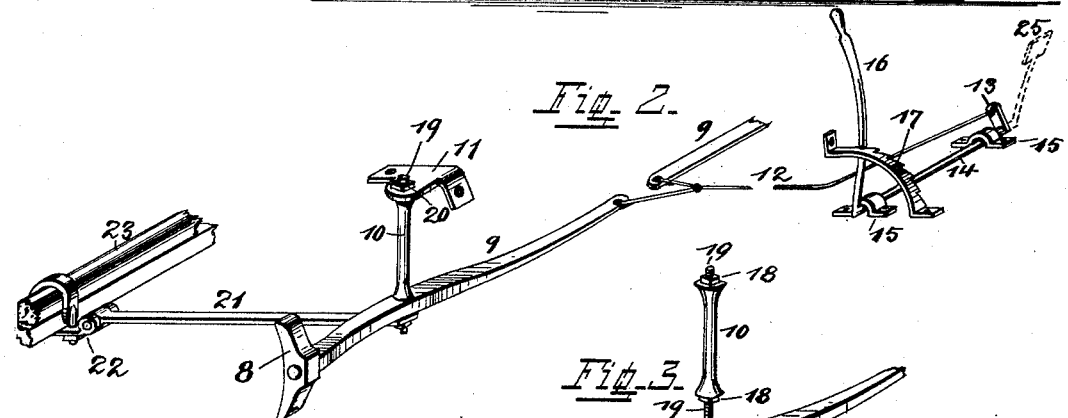
Figure 3:
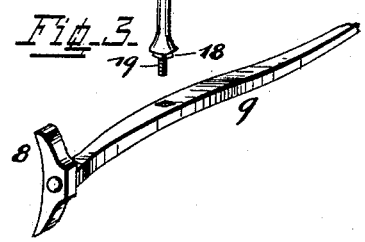
Figure 4:
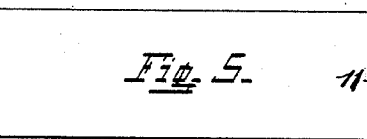
Figure 5:
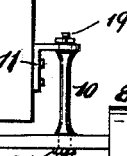

In the following specification and particularly pointed out in the claims at the end thereof, is found a full description of my invention, its operation, parts and construction, which latter is also illustrated in the accompanying drawings, in which:

Figure 1 shows a side-view of a carriage having my improved brake applied. One of the rear-wheels nearest to the observer and the adjacent brake-shoe have been omitted. Fig. 2, is a perspective view of one half of the brake-mechanism as it appears when detached, showing also mechanism whereby it is operated. Figs. 3, and 4, are perspective views of detached details or parts of the construction and Fig. 5, is an end view, showing my brake attached to a wagon, or similar body.

8, is a customary brake-shoe, connected in the usual manner to a brake-beam 9, of which there is one for each brake-shoe on each side of the vehicle. The brake-beams are held in position by elastic pivots 10, one end of which connects to the former, its other end being held by a bracket 11, attached to the vehicle-body. The inner ends of the brake-beams connect to a rod or pliable connection 12, which in turn connects to an arm 13, affixed to a rock-shaft 14. This latter rocks in bearings 15, and is actuated by a lever 16, which by means of a rack 17, may be held in any adjusted position. When lever 16, is pushed forward, the brake-beams will be vibrated in a horizontal plane, turning on their pivotal connections and thereby bring the brake-shoes against the rim of the wheels in the well known manner. The vibration of the brake-beams on their pivots is however not obtained by a connection which permits the former to turn on the latter, or which permits the pivot to turn on its bracket 11. Both of these connections are rigid, pivots 10, having square portions 18, which enter correspondingly shaped holes in the brake-beams and brackets, beyond which round, screw-threaded portions or ends 19, project which receive nuts 20 and thereby complete the connection. The vibration is obtained by a twisting of pivots 10, caused by the action of the brake-beams on their square ends. This twist puts these pivots under torsional tension, which on release of lever 16, from rack 17, asserts itself and by its reaction throws the brake-shoes instantly off from the wheels. In addition to the torsional tension put on pivots 10, by the vibration of the brake-beams when the brake is being set, they are also normally held under a limited tension which is attained by pulling the inner ends of the brake-beams forward before attaching them to connection 12, whereby the pivots become slightly twisted. The torsional resistance of these latter against such twist draws, by means of connection 12, the brake-beams and the parts whereby they are operated constantly toward each other and thereby holds all joints tight and prevents rattling.

The elasticity of pivots 10, is best obtained by making them of spring-steel and of sufficient strength and stiffness to be unaffected by the motion of the vehicle. To give them sufficient support and prevent them from becoming loose or bent on their brackets 11, links 21, which connect to the lower one of their rounded ends 19, extending out from the brake-beams, are provided. These links are slipped on ends 19, before nuts 20, are screwed on, so that these latter in addition to securing the brake-beams to their pivots 10, also serve to hold one end of links 21, in position on these latter parts. The other ends of links 21, are pivotally connected to clips 22, which in turn are affixed to the axle 23, or they might be connected to a circular band lying loosely around the hub. The fixed length of these links prevents any strain on the springs which support the body on the axle and caused by a tendency of the brake, when on, to push wheels and axle out from under the springs and the body supported by them. They also, by reason of their capacity to adjust themselves radially from substantially the center of the wheel and moving with the brake-beams up and down during the vertical vibrations of the body on the springs supporting it, keep the brake-shoes during all such vibrations constantly at the same distance from the wheel-tires and in ready position for engagement with them. To prevent any rattling of these links at their ends where they connect to brake-beams and axle, they are also made of spring-steel and are normally twisted, as shown in Fig. 4. They have to be forced into a straightened position, while put in place, but after such still retain their tendency to return to their normally twisted form and the resistance of the rigid connections at their ends against such a return creates a pressure at these points which most effectually and lastingly counteracts all loose wear and resulting rattling.

The form of brackets 11, may be modified in many ways in order to accommodate the form and shape of the body. Such a modified form is shown in Fig. 5. Again where such is practicable, brackets 11, might be omitted altogether and the upper ends of pivots 10, might pass into and through the floor of the body and secured from the inside by the nuts. The pivot itself may be a round or square steel-bar, or it may be a flat-bar, riveted, bolted or otherwise connected to the body and to the brake-beams. No matter however what form of a pivot or manner of connections is selected, the latter must always be rigid, so that all vibrations of the brake-beams, which cause a yielding at the pivot, cause such yielding to occur between the ends of the latter and by a twisting or torsional movement of the same.

The mechanism whereby the brake-beams are vibrated forms only a secondary part of my invention and may be modified in many ways to suit the particular kind of vehicle. A foot-lever 25, as shown by dotted lines in Fig. 2, may be used in the center in place of lever 16, at the side. Connections 12, may attach directly to lever 16, or 25, and arm 13, may so connect to rock-shaft 14, as to extend downwardly therefrom whereby the motion and operation of levers 16 and 25, would be reversed.

26, is an adjustable swivel-joint whereby the normal distance of the brake-shoes from the wheel-tires may be regulated.

The leading feature of my invention I consider to be a construction whereby torsional tension and resistance are used to counter-act the rattling caused by loose connections and the motion of the vehicle and where the brake-beams are held stiff, or immovably by, and vibrate on a torsional spring.

Having described my invention, I claim as new:

1. In a brake-mechanism of the kind explained, the combination of the brake-beams thereof, with an elastic or spring-pivot, rigidly connected to the former and to the vehicle-body and capable of being put under torsional tension, all as substantially shown and described.

2. In a brake-mechanism of the kind described, the combination with the brake-beams and brake-shoes thereof, of an elastic, or spring-pivot rigidly connected to the former and to the vehicle-body and capable of being twisted or put under torsional tension by the vibrations of the brake-beams, and means to actuate these latter for the purpose of setting the brake, all as substantially shown and described.

3. In a brake-mechanism of the kind described, the combination with the brake-beams and brake-shoes thereof, of a pivot on which the former vibrate, links 21, connecting to these parts with one end, their other ends being pivotally connected to fixed points of the vehicle substantially in line with the centers of the wheels adjacent to the brake-shoes and serving to keep these latter at a fixed distance from the former, these links being of elastic material and having a normal tendency to a torsional movement or twist which, being resisted by the connections at their ends produces a pressure which prevents rattling, and means to actuate the brake-beams for the purpose of setting the brake, all as substantially shown and described.

4. In a brake-mechanism the combination with the brake-shoes, brake-beams and means for actuating these latter, of an elastic, or spring-pivot rigidly connected to the brake-beams and the vehicle body and capable by its torsional resistance to hold the brake-beams immovably to prevent rattling and to keep the brake-shoes normally off of the wheels, all as substantially shown and described.

5. In a brake-mechanism of the kind described, the combination with the brake-shoes, brake-beams and means for actuating these latter, of an elastic or spring-pivot rigidly connected to the brake-beams and the vehicle-body and capable of being twisted or put under torsional tension by the vibrations of the brake-beams, and links 21, connecting the brake-shoes to some fixed point of the vehicle, substantially in line with the centers of the adjacent wheels, all as substantially shown and described.

6. In a brake-mechanism of the kind described, the combination with the brake-shoes, brake-beams and means for actuating these latter, of an elastic or spring-pivot rigidly connected to the brake-beams and the vehicle-body and capable of being twisted or put under torsional tension by the vibrations of the brake-beams, links 21, connecting the brake-mechanism to some fixed point of the vehicle, being of elastic material and having a normal tendency to a torsional movement or twist which, being resisted by the connections at their ends produces a pressure which prevents rattling, all as substantially shown and described.

7. In a brake-mechanism of the kind described, the combination of the brake-shoes, brake-beams, means for actuating them, elastic or spring-pivots rigidly connected to the brake-beams, brackets attached to the vehicle-body to which the other ends of the pivots rigidly connect and links 21, connecting to the brake-beams at the points where pivots 10, connect to them and secured with heir other ends to some fixed point of the vehicle, all as substantially shown and described.

8. In a brake-mechanism of the kind described, the combination with the brake-shoes, brake-beams and means for actuating them, of an elastic or spring-pivot, rigidly connected to the brake-beams and to the vehicle-body and normally held under torsional tension to prevent rattling, all as substantially shown and described.

9. In a brake-mechanism of the kind described, the combination of the brake-shoes, brake-beams, an elastic, or spring-pivot rigidly connected to the latter and the vehicle-body, means to actuate the brake-beams, a rope, or rod to connect these two latter, which connection also constantly draws these parts together by the action on the brake-beams of the pivot 10, which is normally held under torsional tension, whereby rattling of the parts is prevented, all as substantially shown and described.

In testimony whereof I affix my signature in presence of two witnesses.

JOHN M. MILLER.

Witnesses:
ALFRED N. DAVIES,
C. SPENGEL.